(12) United States Patent
Schellinger

(10) Patent No.: US 11,338,722 B2
(45) Date of Patent: May 24, 2022

(54) CONTROL SYSTEM FOR AUTONOMOUS VEHICLE LIGHTING

(71) Applicant: Lumileds LLC, San Jose, CA (US)

(72) Inventor: Sven Schellinger, Herzogenrath (DE)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 17/060,704

(22) Filed: Oct. 1, 2020

(65) Prior Publication Data

US 2021/0101520 A1 Apr. 8, 2021

(30) Foreign Application Priority Data

Oct. 2, 2019 (EP) .................................. 19201079

(51) Int. Cl.
*B60Q 1/00* (2006.01)
*F21K 9/00* (2016.01)
*G05D 1/00* (2006.01)

(52) U.S. Cl.
CPC ......... *B60Q 1/0076* (2013.01); *B60Q 1/0094* (2013.01); *F21K 9/00* (2013.01); *G05D 1/0055* (2013.01)

(58) Field of Classification Search
CPC ............................ F21S 43/14; F21W 2103/00
See application file for complete search history.

(56) References Cited

U.S. PATENT DOCUMENTS

| 2011/0137757 A1 | 6/2011 | Paolini et al. |
| 2018/0363859 A1 | 12/2018 | Petluri et al. |
| 2019/0049090 A1 | 2/2019 | Krishnan et al. |
| 2019/0061607 A1 | 2/2019 | Wieczorek et al. |
| 2020/0200356 A1* | 6/2020 | Potter ...................... B60Q 1/28 |

FOREIGN PATENT DOCUMENTS

| DE | 102015212652 A1 | 1/2017 |
| EP | 3800969 A1 | 4/2021 |
| WO | 2013169642 | 11/2013 |

OTHER PUBLICATIONS

"International Application Serial No. PCT/US2020/053974, International Search Report dated Dec. 15, 2020", 4 pgs.
"International Application Serial No. PCT/US2020/053974, Written Opinion dated Dec. 15, 2020", 8 pgs.
"European Application Serial No. 19201079.1, extended European Search Report dated Feb. 25, 2020", 8 pgs.
"European Application Serial No. 19201079.1, EPO Written Decision to Refuse dated Apr. 15, 2021", 2 pgs.

* cited by examiner

*Primary Examiner* — Robert J May
(74) *Attorney, Agent, or Firm* — Schwegman Lundberg & Woessner, P.A.

(57) ABSTRACT

An automotive lighting control system is provided. A light-emitting diode (LED) system of an at least partially autonomous vehicle can include a first group of LEDs including cyan and amber LEDs, a second group of LEDs including cyan and at least one of red or amber LEDs, a third group of LEDs including cyan LEDs, and a controller configured to receive a first control signal indicating whether the at least partially autonomous vehicle is in autonomous drive mode or manual drive mode and cause the cyan LEDs of the first, second, and third groups LEDs to provide perceived cyan light when and only when the autonomous vehicle is in the autonomous drive mode.

18 Claims, 14 Drawing Sheets

CONTROL SYSTEM FOR AUTONOMOUS VEHICLE LIGHTING

RELATED APPLICATION

This application claims the benefit of priority to European Patent Application EP19201079.1 titled "Lighting Device and Lighting System" and filed on Oct. 2, 2019, which is incorporated herein by reference in its entirety.

FIELD OF THE INVENTION

The present disclosure relates to a lighting device control system, in particular to controlling a light emitting diode (LED) based lighting device for vehicular applications and/or for display applications, and to a corresponding lighting system.

BACKGROUND

LEDs can be advantageous light sources and are suitable for automotive lighting systems including headlights, daytime running lamps, position lamps, fog lamps, indicator lamps, brake lamps, logo illumination, decorative light, interior lights or reversing lamps, among others. LEDs can be advantageous light sources for LED displays. However, while advantages of LED based lighting systems result from energy efficiency and long lifetime, drawbacks result from a given LED emitting light only in a narrow band of wavelengths. Therefore, generation of white light by mixing LED light of different colors remains improvable as small deviations in hue of light emitted by the corresponding LEDs may result in undesirable deviations in color temperature of generated white light.

A further challenge that results from limited emission bands of LEDs is that existing LED displays only have a limited color space such that an improvement in color space may enable more natural and realistic presentations. Further, technological advances in the automotive field enable modern vehicles to be used in different driving modes including manual and automated driving modes. In particular, in the latter case, it may be advantageous in many situations if, for example, pedestrians or police are informed that a moving vehicle is operated in an automated driving mode.

SUMMARY

This summary section is provided to introduce aspects of embodiments in a simplified form, with further explanation of the embodiments following in the detailed description. This summary section is not intended to identify essential or required features of the claimed subject matter, and the combination and order of elements listed in this summary section are not intended to provide limitation to the elements of the claimed subject matter.

Embodiments regard an at least partially autonomous vehicle and control systems therefore that provide a visible indication of whether the vehicle is in autonomous drive mode or manual drive mode. Embodiments can provide the indication so that it is visible from all sides of the vehicle. The indication can be visible but provided so as to not obscure normal vehicle indicators that are provided in normal color ranges. Normal vehicle indicators, sometimes called overriding indicators, can include a parking indicator, a reverse indicator, headlights, turn signals, brake indicators, among others.

A light-emitting diode (LED) system of an at least partially autonomous vehicle can include a first group of LEDs including cyan and amber LEDs, a second group of LEDs including cyan and at least one of red or amber LEDs, and a third group of LEDs including (only) cyan LEDs. The system can include a controller configured to receive a first control signal indicating whether the at least partially autonomous vehicle is in autonomous drive mode or manual drive mode. The controller can cause the cyan LEDs of the first, second, and third groups LEDs to provide perceived cyan light when and only when the autonomous vehicle is in the autonomous drive mode. The first, second, and third groups of LEDs can include micro-LED arrays.

The first, second, and third groups of LEDs are situated such that they produce cyan color visible from all sides of the autonomous vehicle. The first, second, and third groups of LEDs are arranged such that they produce cyan color in a continuous, uninterrupted line around the vehicle while the vehicle is in the autonomous drive mode. The first, second, and third groups of LEDs are arranged such that they produce cyan color in a continuous, uninterrupted line around the vehicle unless there is an overriding indicator and while the vehicle is in the autonomous drive mode.

The controller can be configured to receive a second control signal indicating whether a turn signal of the autonomous vehicle is activated and cause the first and second group of LEDs to generate a perceived, non-cyan flashing light while the third LED group emits cyan when the vehicle is in an autonomous drive mode and does not emit when the vehicle is in manual drive mode. The controller can be configured to receive a third control signal indicating whether headlights of the autonomous vehicle are to be powered on and cause the first group of LEDs to generate a perceived continuous white light while the second and third LED groups emit cyan when the vehicle is in an autonomous drive mode and do not emit when the vehicle is in manual drive mode.

The controller can be configured to receive a fourth control signal indicating whether brakes of the autonomous vehicle are engaged and cause the second group of LEDs to generate a perceived continuous red or amber light while the first and third LED groups emit cyan when the vehicle is in an autonomous drive mode and do not emit when the vehicle is in manual drive mode.

The controller can be configured to receive a fifth control signal indicating whether an engine of the autonomous vehicle is in park and cause the first group of LEDs to generate a perceived continuous white light and the second group of LEDs to generate a perceived continuous red light while the second LED group emits cyan when the vehicle is in an autonomous drive mode and do not emit when the vehicle is in manual drive mode. Other embodiments will be realized in light of the Detailed Description and Figs.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like).

Figure 1A:
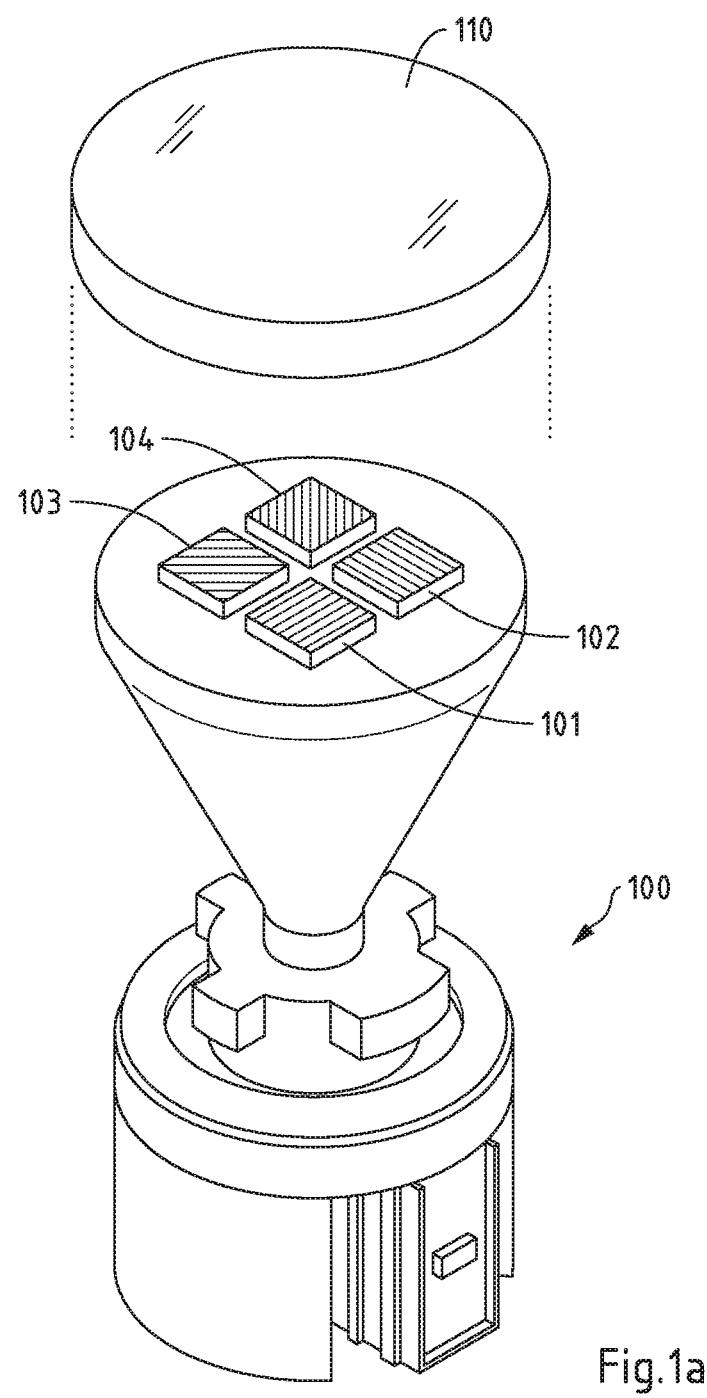
FIG. 1a shows a schematic representation of a lighting device according to an embodiment.

FIG. 1a shows a lighting device 100 according to an embodiment of the invention. The lighting device 100 is a light emitting diode (LED) 100 for example to be used as functional lamp for a vehicle such as a car or a motorcycle, the functional lamp including an automated vehicle marker lamp. In the shown example, four different LEDs 101 (an example of a first light source), 102 (an example of a second light source), 103 (an example of a third light source) and 104 (an example of a fourth light source) are incorporated into the LED 100. However, fewer or more LEDs may be employed. In the shown case, LED 101 is an LED configured to emit light of blue color, LED 102 is an LED configured to emit light of amber color, LED 103 is an LED configured to emit light of red or deep red color and LED 104 is an LED configured to emit light of cyan color. As indicated in the figure, the LEDs are arranged in close proximity at the lighting device 100, such that when more than one LED is turned on, light generated from the LEDs mixes efficiently into a mixed color. In particular, the LEDs are arranged at lighting device 100, and respective color values are selected, such that when all LEDs are turned on, light emitted from all of the LEDs is mixed to generate light of white color. As further indicated in the figure, further optical elements 110 may be provided such as one or more collimating lenses and/or a diffuser.

Figure 1B:
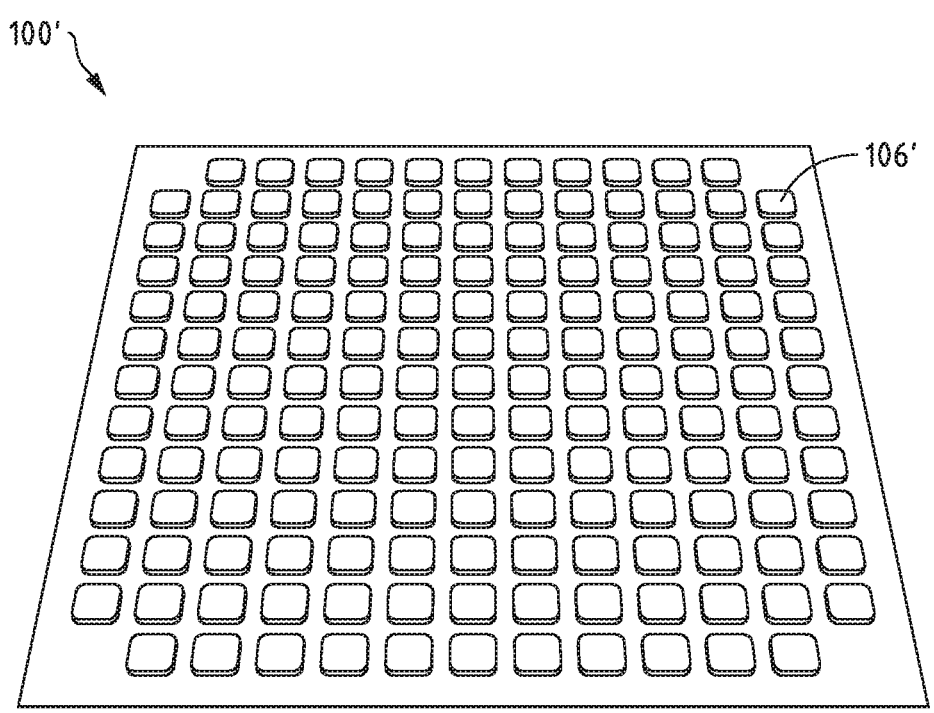
FIG. 1b shows a schematic representation of a lighting device according to a further embodiment.

FIG. 1b shows a lighting device 100' according to a further embodiment. In this embodiment, lighting device 100' is a display including a plurality of pixels 106', where each pixel includes two or more LEDs, LEDs 101 (an example of a first light source), 102 (an example of a second light source), 103 (an example of a third light source) and 104 (an example of a fourth light source) of FIG. 1a.

Figure 1C:
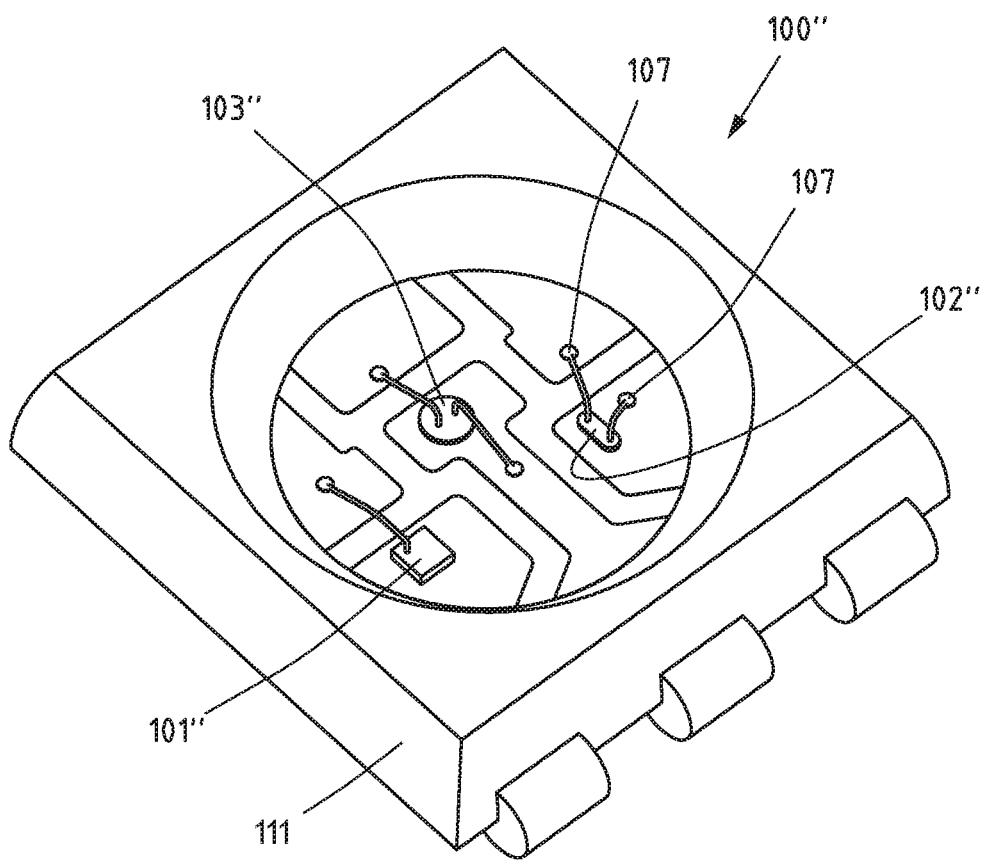
FIG. 1c shows a schematic representation of a lighting device according to a further embodiment.

FIG. 1c shows a lighting device 100" according to a further embodiment. In this embodiment, lighting device 100" comprises a housing 111 that contains three LED dies 101", 102" and 103" electrically contacted using contact lines 107 (only two labeled). LEDs 101", 102" and 103" are further examples of a first, a second and a third light source, configured to emit light of respective colors that can be mixed (e.g., into white light) when turned on in sequence at various duty cycles or simultaneously at varying power. For example, in addition to a unique color of light emitted by the respective LED, in order to achieve white light of a suitable color tone or temperature, each of the LEDs may be turned on at a dedicated predefined power.

Figure 1D:
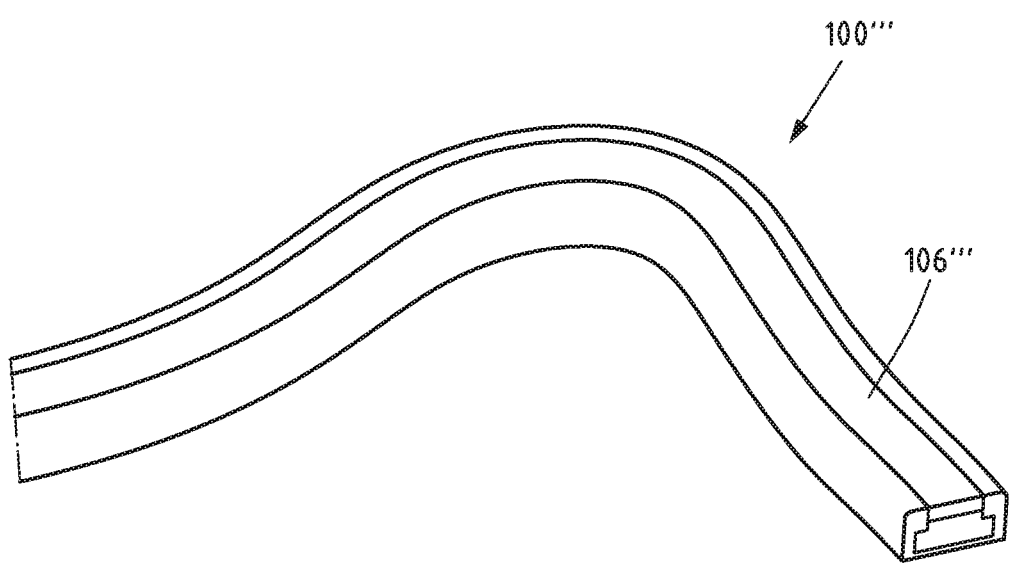
FIG. 1d shows a schematic representation of a lighting device according to a further embodiment.

FIG. 1d shows a lighting device 100'" according to yet a further embodiment. In this embodiment, lighting device 100'" is embodied as a strip comprising a plurality of LEDs below lighted surface 106'", where each LED may correspond to any one of the first, the second, the third, and/or the fourth light source. It is noted that being configured to emit light of a first color, second color, third color and/or fourth color, in an embodiment, each of the first, the second, the third, and the fourth light source may be configured to tune within a predefined range at the first color, second color, third color, and/or fourth color.

Figure 2:
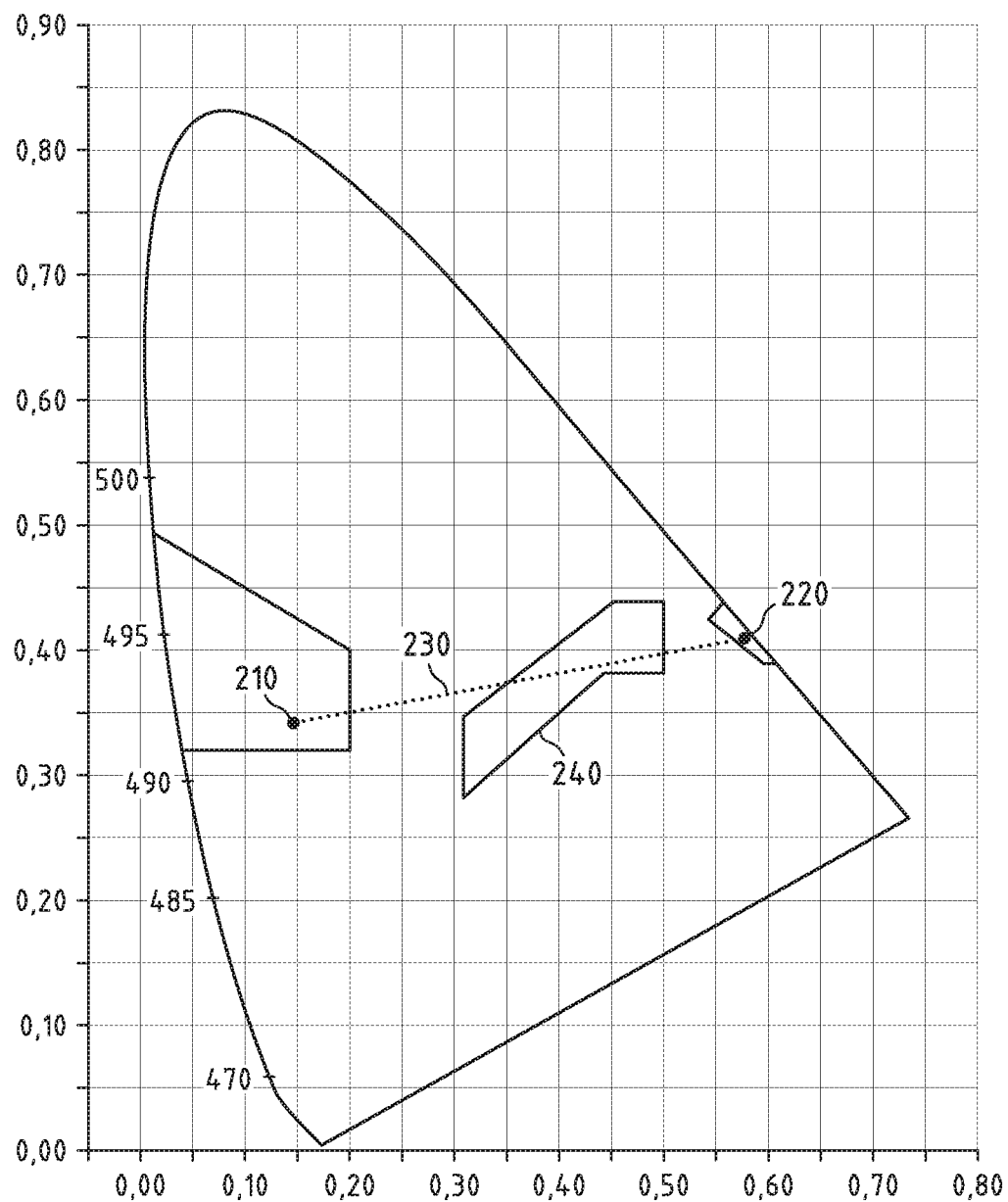
FIG. 2 shows a CIE color space diagram for a lighting device according to an embodiment.

FIG. 2 shows an International Commission on Illumination (CIE) color space diagram for a lighting device comprising a first light source configured to emit light of a cyan color and a second light source configured to emit light of an amber color. The first light source generates light with a color approximately at point 210 within a cyan area of the color space. The second light source generates light with a color approximately at point 220 within an amber area of the color space. Thereby, the cyan and the amber areas are as defined above. A line 230 connecting point 210 and point 220 crosses a white area 240 of the CIE color space indicating that light generated by mixing light generated by the first light source and light generated by the second light source has a white color. The white area is similarly as defined above.

With the possibility of having turned on only the second light source of amber color (by means of a corresponding controller of a lighting system (e.g., of a car)), the lighting device is employable as turn indicator lamp of a car. With the possibility of having turned on only the first light source of cyan color, the lighting device is employable to indicate an automated driving mode of the car. Further, with the possibility of having turned on both light sources to generate white light, the lighting device is employable as white daytime running lamp, as position lamp, as fog lamp (at a front of a car) or as reversing lamp (at a back of a car) or as decorative light (at all sides of the car) or as logo illumination (at all sides of the car). The lighting device thus incorporates multiple functionalities within one single device, while the first light source of cyan color not only enables an additional functionality but also enhances an available color space.

Figure 3:
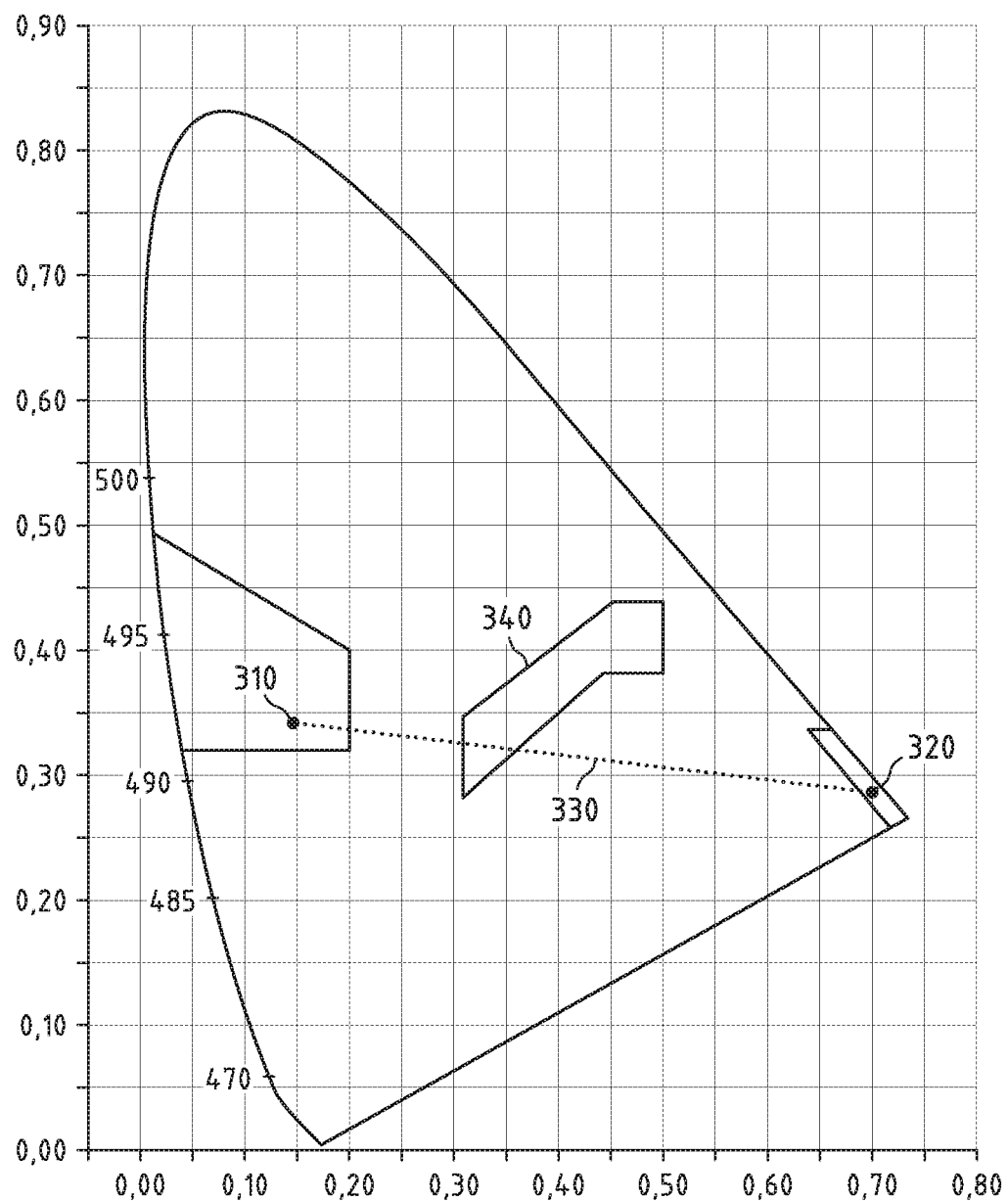
FIG. 3 shows a CIE color space diagram for a lighting device according to an embodiment.

FIG. 3 shows a CIE color space diagram for a lighting device comprising a first light source configured to emit light of a cyan color and a second light source configured to emit light of a red or deep red color. The first light source generates light with a color approximately at point 310 within a cyan area of the color space. The second light source generates light with a color approximately at point 320 within a red or deep red area of the color space, the red area as defined above. A line 330 connecting point 310 and point 320 crosses a white area 340 of the CIE color space indicating that light generated by mixing light generated by the first light source and light generated by the second light source has a white color.

With the possibility of having turned on only the second light source of red or deep red color (by means of a corresponding controller of a lighting system (e.g., of a car)), the lighting device is employable as stop lamp or taillight lamp or turn indicator or fog lamp at a rear of a car.

With the possibility of having turned on only the first light source of cyan color, the lighting device is employable to indicate an automated driving mode of the car. Further, with the possibility of having turned on both light sources to generate white light, the lighting device is employable as white reversing lamp, decorative light, illuminated logo or display at the back of the car. One or more of the LEDs can be dimmed, such as separately for tuning the color, but also for employing different applications within one embodiment (e.g., full power for reversing light, dimmed for illuminated logo in same device). Again, the lighting device thus incorporates multiple functionalities within one single device, while the first light source of cyan color not only enables an additional functionality but also enhances an available color space.

Figure 4:
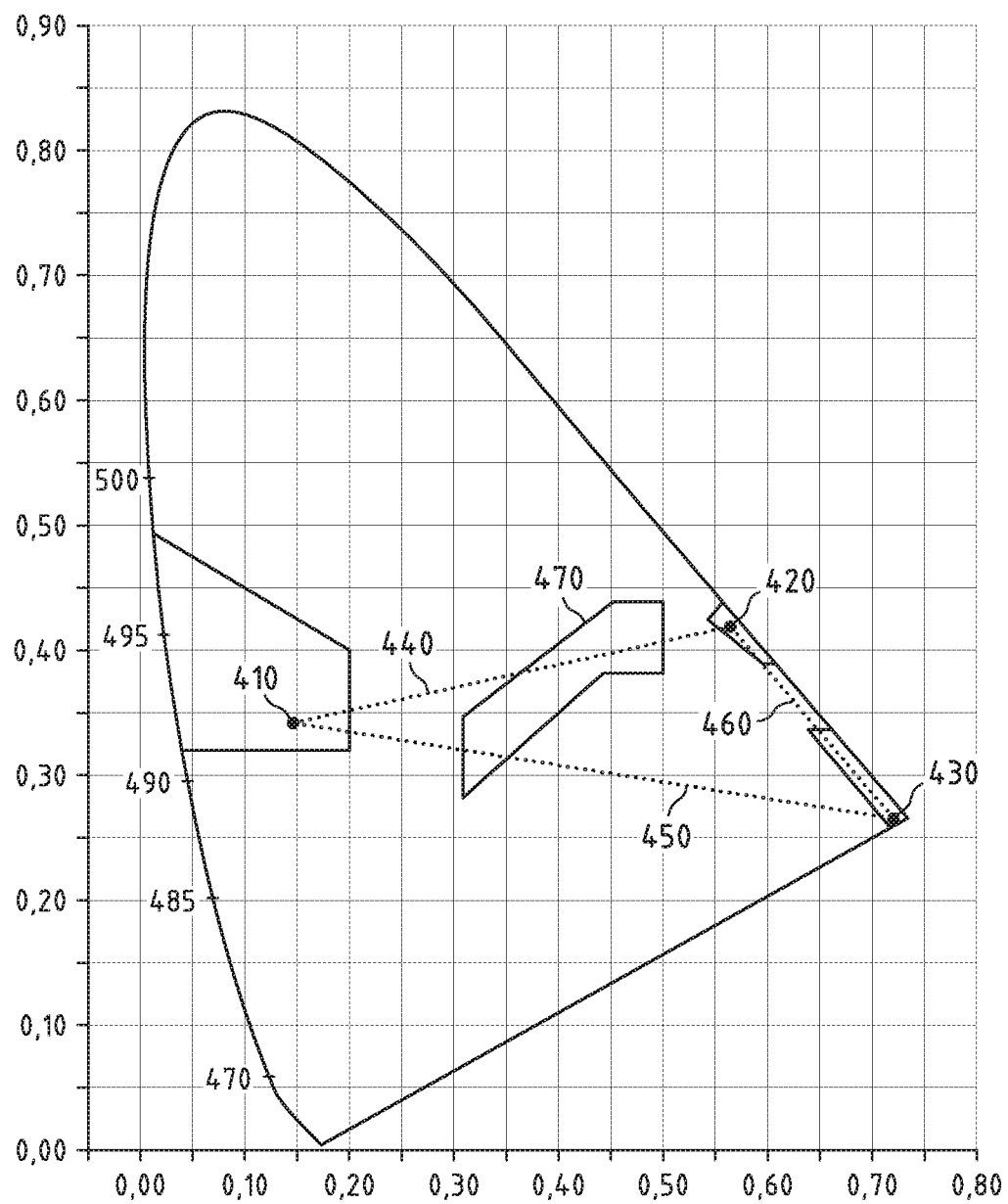
FIG. 4 shows a CIE color space diagram for a lighting device according to an embodiment.

FIG. 4 shows a CIE color space diagram for a lighting device comprising a first light source configured to emit light of a cyan color, a second light source configured to emit light of an amber color and a third light source configured to emit light of a red or deep red color. The first light source generates light with a color approximately at point 410 within a cyan area of the color space. The second light source generates light with a color approximately at point 420 within an amber area of the color space. The third light source generates light with a color approximately at point 430 within a red or deep red area of the color space. A line 440 connecting point 410 and point 420 crosses a white area 470 of the CIE color space. A line 440 connecting point 410 and point 430 similarly crosses a white area 470 of the CIE color space. Thus, as indicated by lines 440, 450 and 460, light generated by mixing light generated by the first light source, light generated by the second light source and light generated by the third light source can be adjusted to have a color within a range defined by the area enclosed by lines 440, 450 and 460. Thus, within this area, in particular light of a white color can be generated, this white color being particularly tunable within the range defined by lines 440, 450 and 460.

With the possibility of having turned on only the second light source of amber color (by means of a corresponding controller of a lighting system (e.g., of a car)), the lighting device is employable as turn indicator lamp of a car. With the possibility of having turned on only the third light source of red or deep red color (by means of a corresponding controller of a lighting system (e.g., of a car)), the lighting device is employable as stop lamp or taillight lamp or turn indicator or fog lamp at a rear of a car. With the possibility of having turned on only the first light source of cyan color, the lighting device is employable to indicate an automated driving mode of the car. Further, with the possibility of having turned on all light sources to generate white light, the lighting device is employable as white daytime running lamp, as position lamp, as fog lamp (at a front of a car) or as reversing lamp (at a back of a car) or decorative light or illuminated logo or display (at all sides of a car). With all these possibilities, the lighting device can advantageously be employed at the front and at the back of a car while functionalities of the lamp can advantageously be adjusted to the driving direction of the car. Thus, the lighting device thus advantageously incorporates multiple functionalities within one single device, while the first light source of cyan color not only enables an additional functionality but also enhances an available color space.

Figure 5:
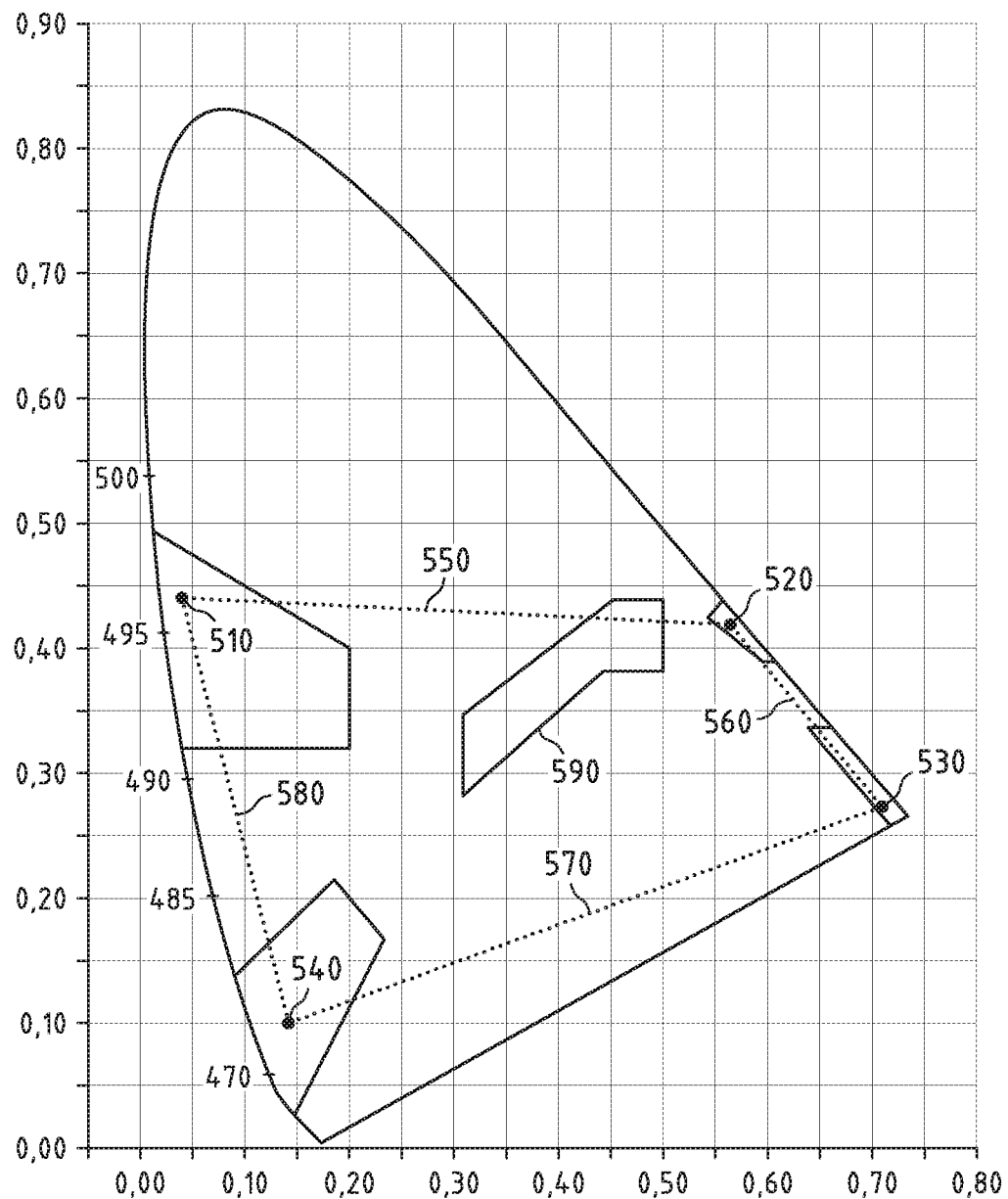
FIG. 5 shows a CIE color space diagram for a lighting device according to an embodiment.

FIG. 5 shows a CIE color space diagram for a lighting device comprising a first light source configured to emit light of a cyan color, a second light source configured to emit light of an amber color, a third light source configured to emit light of a red or deep red color and a fourth light source configured to emit light of a blue color. The first light source generates light with a color approximately at point 510 within a cyan area of the color space. The second light source generates light with a color approximately at point 520 within an amber area of the color space. The third light source generates light with a color approximately at point 530 within a red or deep red area of the color space. The fourth light source generates light with a color approximately at point 540 within a blue area of the color space, the blue area as defined above. Lines 550, 560, 570 and 580 connect the respective points and cross white area 590 thus indicating the possibility to generate white light by mixing light generated by the respective light sources.

The lighting device according to FIG. 5 is applicable at a front and/or at a back of a vehicle, such as a car. By selectively controlling the respective light sources to generate cyan, amber, or red colors, the corresponding functionalities can be enabled. At the same time, the addition of the blue light source greatly enhances the available color space, enables a white color with a colder color temperature and enables use of the lighting device to generate a blue or colorful or color changing welcome light or decorative light or logo illumination or as display.

Figure 6:
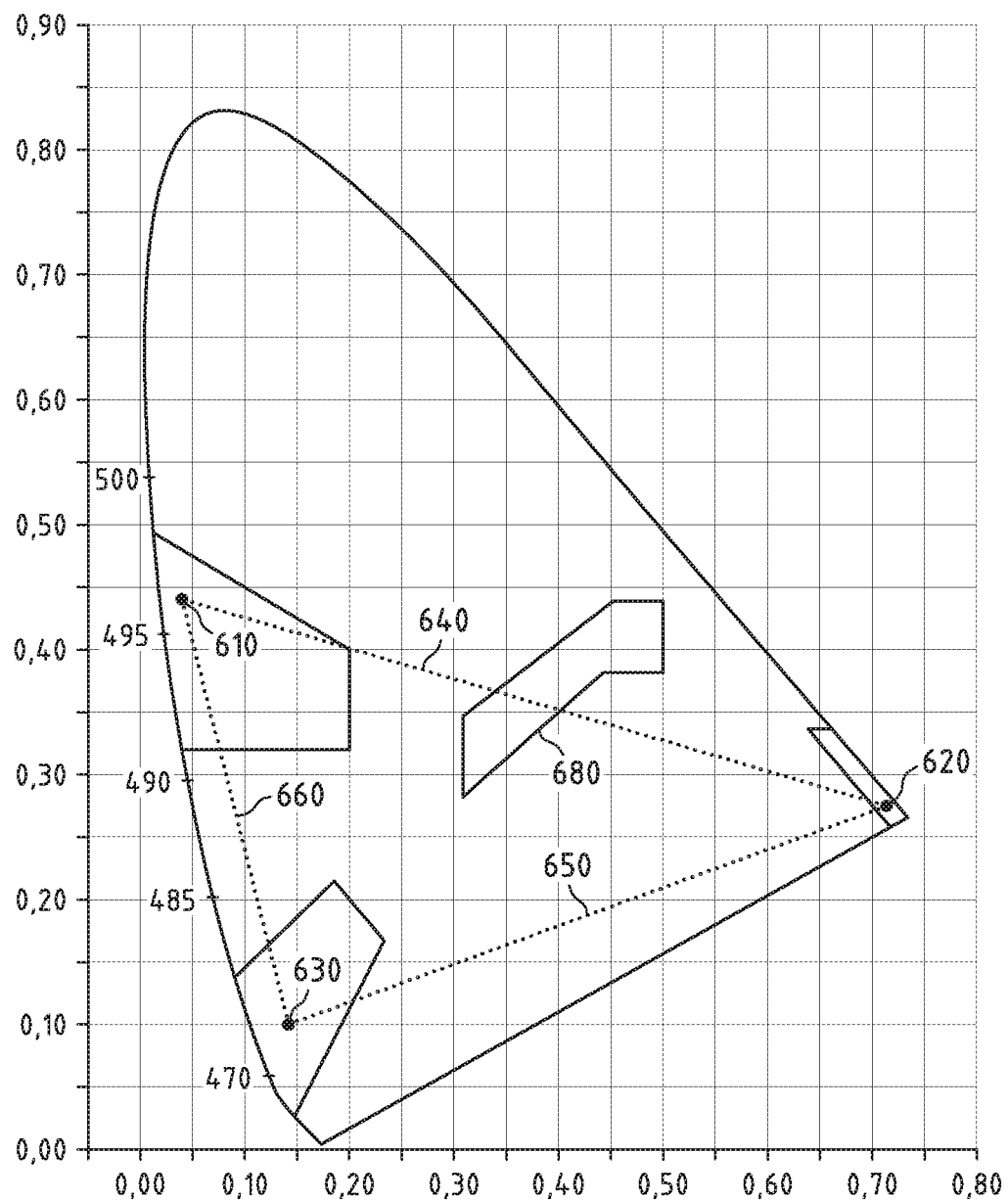
FIG. 6 shows a CIE color space diagram for a lighting device according to an embodiment.

FIG. 6 shows a CIE color space diagram for a lighting device comprising a first light source configured to emit light of a cyan color, a second light source configured to emit light of a red or deep red color and a third light source configured to emit light of a blue color. The first light source generates light with a color approximately at point 610 within a cyan area of the color space. The second light source generates light with a color approximately at point 620 within a red/deep red area of the color space. The third light source generates light with a color approximately at point 630 within a blue area of the color space. Lines 640, 650, and 660 connect the respective points and cross white area 680 thus indicating the possibility to generate white light by mixing light generated by the respective light sources.

The lighting device according to FIG. 6 is in particular applicable at a back of a vehicle such as a car. By selectively controlling the respective light sources to generate cyan and red colors, the corresponding functionalities can be enabled. At the same time, the addition of the blue light source greatly enhances the available color space, enables a white color with a colder color temperature and enables use of the lighting device to generate a blue or colorful or color changing welcome light or decorative light or logo illumination or as display.

Figure 7:
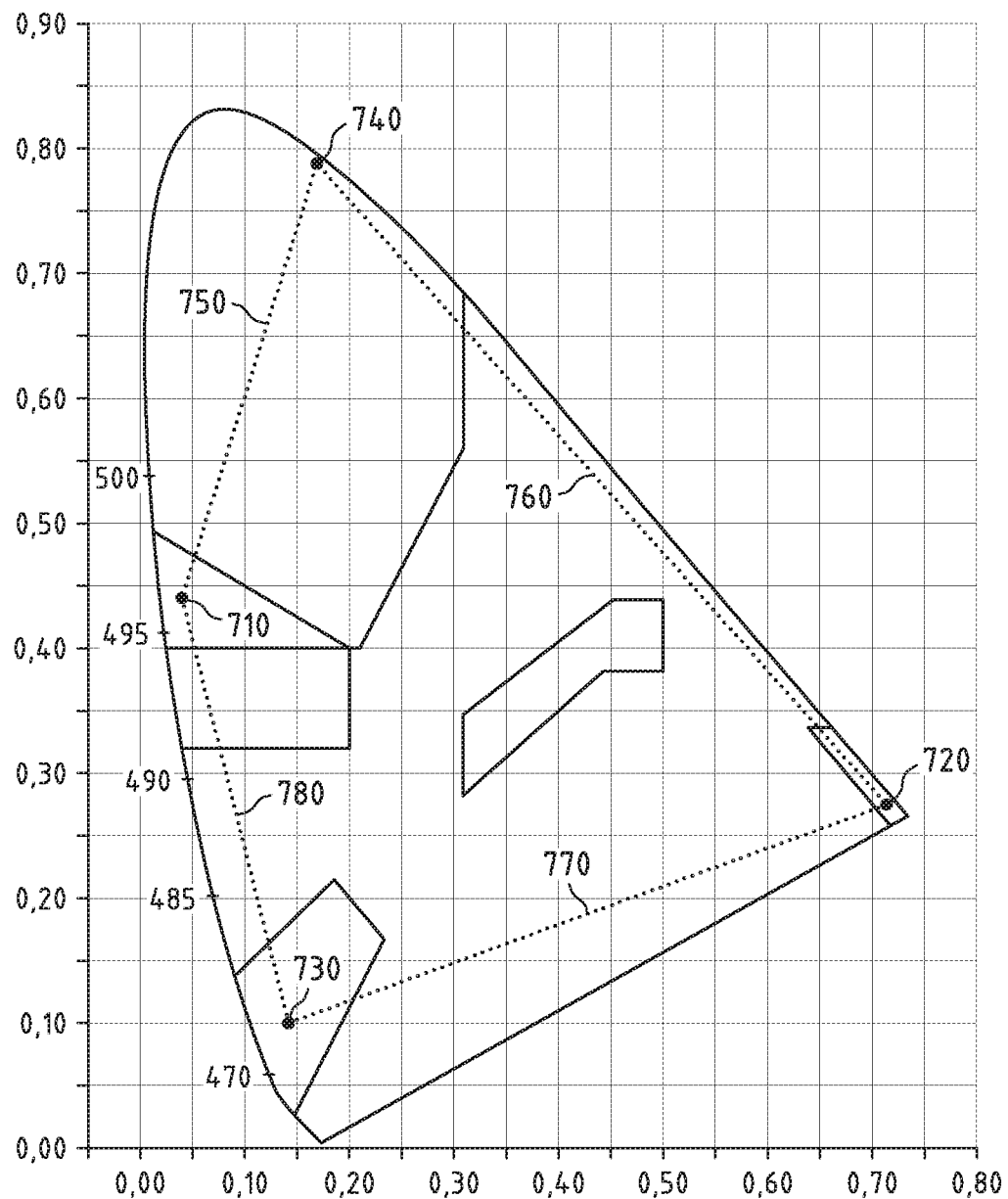
FIG. 7 shows a CIE color space diagram for a lighting device according to an embodiment.

FIG. 7 shows a CIE color space diagram for a lighting device comprising a first light source configured to emit light of a cyan color, a second light source configured to emit light of a red or deep red color, a third light source configured to emit light of a blue color and a fourth light source configured to emit light of a green color. The first light source generates light with a color approximately at point 710 within a cyan area of the color space. The second light source generates light with a color approximately at point 720 within a red/deep red area of the color space. The third light source generates light with a color approximately at point 730 within a blue area of the color space. The fourth light source generates light with a color approximately at point 740 within a green area of the color space, the green area as defined above. Lines 750, 760, 770 and 780 connect the respective points and span an area essentially corresponding to the entire color space.

The lighting device according to FIG. 7 is thus in particular advantageously applicable for display applications. In other words, a lighting device with light sources generating light at points 710, 720, 730 and 740 of FIG. 7 is in particular suited to be used as pixel 106' for a lighting device 100' as shown in FIG. 1b. With such lighting device, an enhanced color space becomes available which facilitates generation of realistic and natural colors.

Figure 8:
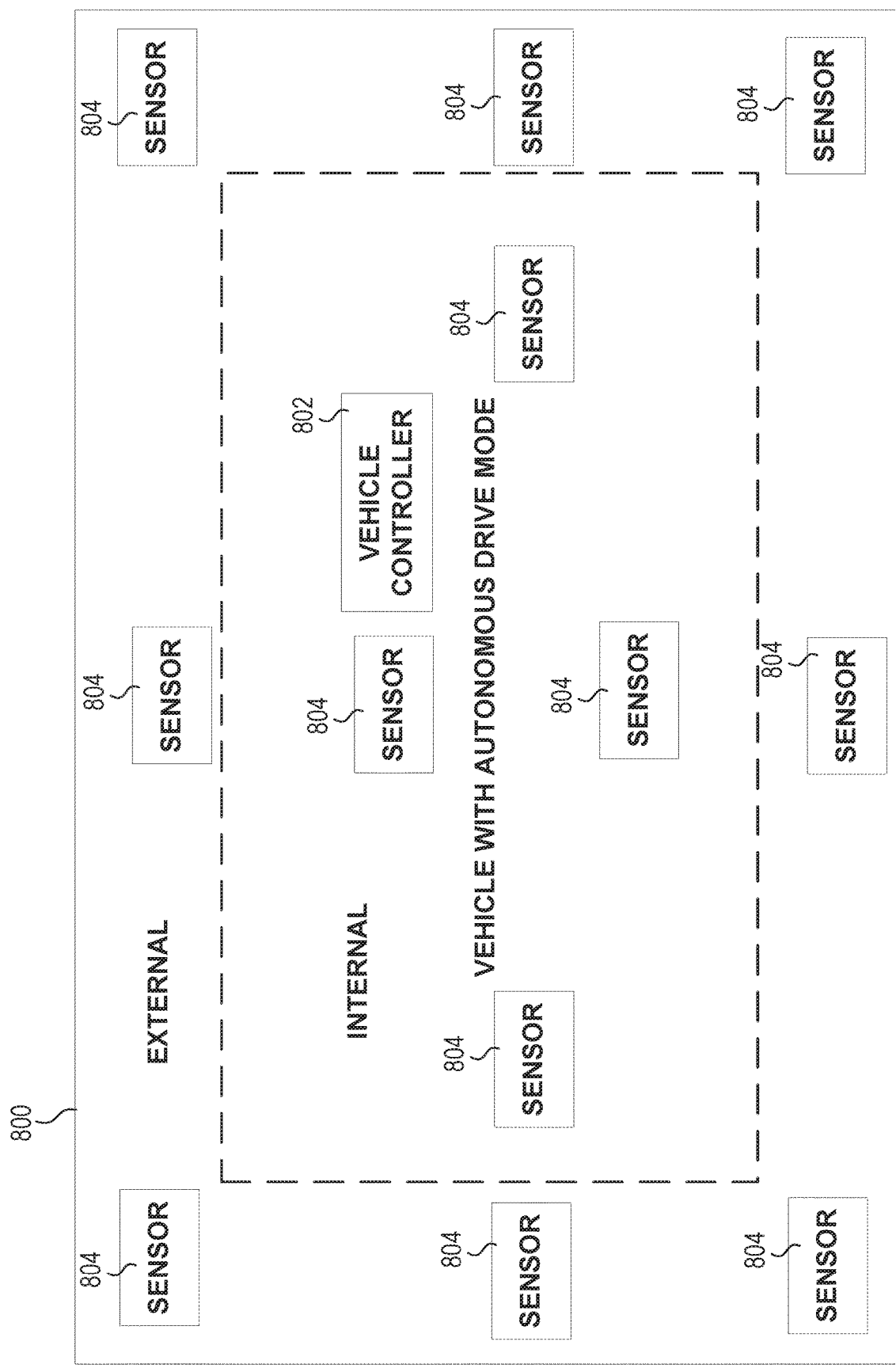
FIG. 8 shows an autonomous vehicle control system and peripheral devices according to an embodiment.

FIG. 8 shows a conceptual block diagram of a vehicle 800 with an autonomous drive mode. The vehicle 800 as illustrated includes a vehicle controller 802 electrically coupled to a plurality of sensors 804. The electrical coupling between the controller 802 and the sensors 804 is not illustrated, so as to not obscure the view provided by FIG. 8. The vehicle controller 802 can include processing circuitry configured to receiver input from the sensors 804. The vehicle controller 802 can control operation of an engine, window, door, light, heating ventilation and air conditioning (HVAC), or the like, based on the input of the sensors 804. The sensors 804 can include a proximity, temperature, camera, radio detection and ranging (RADAR), light detection and ranging (LIDAR), location (e.g., a global positioning system (GPS), Galileo system, or the like), battery power, moisture, oxygen, or the like. The sensors 804 can be internal or external to the vehicle 800. In this context, internal and external indicate whether the characteristic being monitored by the sensor 804 is internal or external to the vehicle 800.

One or more of the sensors 804 can include a push button, user interface (e.g., a touch screen, microphone, keyboard, toggle switch, joystick, gas pedal, brake, or the like), through which the user can alter operation of the vehicle 800. For example, the user 800 can switch the vehicle from autonomous drive mode to manual drive mode using a push button, toggle switch, touchscreen, voice command, or the like. In autonomous drive mode, the user typically provides the vehicle controller 802 with a destination, and sometimes a route to get to the destination, and the autonomous vehicle 800 will operate the systems of the vehicle 800 to pilot to the destination.

As previously discussed, a pedestrian, bicyclist, motorist, service vehicles (e.g., tow trucks, emergency vehicles (ambulance, police, fire, or the like), highway patrol personnel, or other person or vehicle on the road can benefit from knowing whether the vehicle 800 is in autonomous drive mode. Police, for example, can benefit from knowing if a driver is driving or a car is driving autonomous (e.g., when a driver is reading a newspaper or sleeping while sitting on the driver's seat, or the like). The lighting system of the vehicle 800 (see FIG. 9) can indicate to the other entities on the road, whether the vehicle is in manual or autonomous drive mode.

Figure 9:
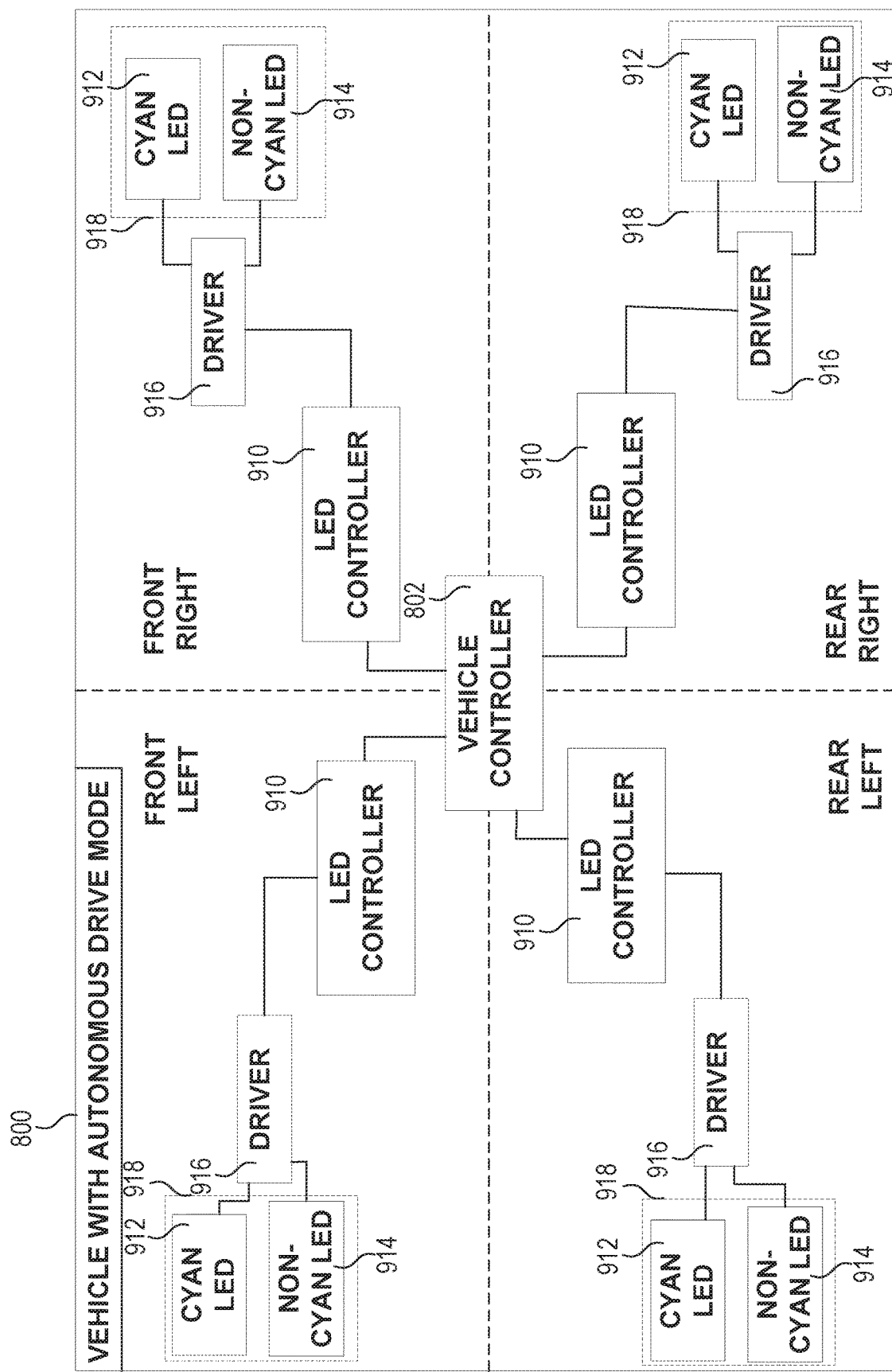
FIG. 9 shows a conceptual block diagram of a lighting system of an at least partially autonomous vehicle according to an embodiment.

FIG. 9 shows a conceptual block diagram of a lighting system of an at least partially autonomous vehicle 800 according to an embodiment. The lighting system includes one or more LED controllers 910 coupled to the vehicle controller 802. The vehicle controller 802 can receive input from a sensor 804 of the vehicle 800. The vehicle controller can provide control signals to the LED controllers 910 that cause the LED controllers 910 to control operation of the LEDs 912, 914 using the LED drivers 916.

The LED controllers 910 can be configured to provide entities external to the vehicle 800 an indication of whether the vehicle is operating in autonomous or manual drive mode and simultaneously provide an overriding indicator. The indication of autonomous drive mode can include a perceived cyan color, such as emitted by a cyan LED 912. The cyan color can be visible only when the vehicle 800 is in autonomous drive mode. When in manual drive mode, the cyan color can be emitted, but not visible due to mixing of the cyan color with a non-cyan color emitted by the LED 914. When in manual drive mode, the cyan color can be concealed by not driving the LED 912.

In an embodiment, the cyan LEDs 912 can be situated so as to provide an indication of the vehicle 802 drive mode that is perceptible from all sides of the vehicle 802. The cyan color, in an embodiment, can be visible in a continuous line around the vehicle 802. The cyan color, in an embodiment, can be visible in a continuous line around the vehicle 802 unless an overriding indicator is required along the continuous line. An overriding indicator can include a turn signal, headlights, brake light, parking light, or other car function that provides another entity on the road an indication of the intent of the vehicle 802 or provides visibility to a passenger or sensor 804 of the vehicle 800.

The LED controller 910 can operate to cause the LED driver 916 to power the LEDs 912, 914 to indicate the driving mode of the vehicle 802 and overriding indicators simultaneously. The LED controller 910 can issue command signals to the LED driver 916 that cause the LED driver 916 to power the LEDs 912, 914 consistent with the driving mode and the overriding indicator of the vehicle 802 operation.

Each of a cyan LED 912 and a non-cyan LED 914 can form a group of LEDs 918. Each group of LEDs 918 can be dedicated to a specific indicator of the vehicle 802. For example, at least one first group of LEDs 918 can be dedicated to providing a turn signal indicator, at least one second group of LEDs 918 can be dedicated to providing a braking indicator, at least one third group of LEDs 918 can be dedicated to providing a parked car indicator, at least one fourth group of LEDs 918 can dedicated to providing headlight light, at least one fifth group of LEDs 918 can be dedicated to providing another external indicator for the vehicle 802.

A control vector can be stored by the LED controller 910 and updated by data from the vehicle controller 802. The control vector can be used to issue commands to the LED driver 916. The LED driver 916 can control electrical power to the LEDs 912, 914 to control operation of the LEDs 912, 914. The operation of the LEDs 912, 914 can provide a vehicle mode indication with overriding indicators. The control vector can include five (or more or fewer) entries and the controller 910 can cause the LED driver 916 to power the LEDs 912, 914 according to the values of the control vector. In Table 1 control vector corresponds to (autonomous, park, turn signal, brake, headlights) such that (1, 0, 0, 0, 1) indicates that the vehicle is in autonomous drive mode, not in park, turn signal is not on, brakes are not pressed, and the headlights are on.

TABLE 1

Autonomous Vehicle Lighting Control Matrix

| CONTROL VECTOR | CONTROL |
|---|---|
| (1, 0, 0, 0, 0) | All groups of LEDs power ON CYAN LEDs and power OFF all other LEDs |
| (0, X, X, X, X) | All groups of LEDs power OFF CYAN LEDs and power ON/OFF NON-CYAN LEDs per normal manual drive operation |
| (1, 1, 0, 0, 0) | All groups of LEDs power ON CYAN LEDs and power OFF NON_CYAN LEDs, but group of rear LEDs (1) powers OFF CYAN LEDs and powers ON NON-CYAN LEDs or (2) mix CYAN LEDs and NON-CYAN LEDs to generate mixed Color |
| (1, 0, 1, 0, 0) | All groups of LEDs power ON CYAN LEDs and power OFF NON-CYAN LEDs, but group of rear and front LEDs (1) powers OFF CYAN LEDs and periodically powers ON NON-CYAN LEDs or (2) periodically mix CYAN LEDs and NON-CYAN LEDs to generate flashing mixed color |
| (1, 0, 0, 1, 0) | All groups of LEDs power ON CYAN LEDs and power OFF NON-CYAN LEDs, but group of rear LEDs (1) powers OFF CYAN LEDs and powers ON NON-CYAN LEDs or (2) mix CYAN LEDs and NON-CYAN LEDs to generate mixed color |
| (1, 0, 0, 0, 1) | All groups of LEDs power ON CYAN LEDs and power OFF NON-CYAN LEDs, but group of rear and front LEDs (1) powers OFF CYAN LEDs and powers ON NON-CYAN LEDs or (2) mix CYAN LEDs and NON-CYAN LEDs to generate mixed color |

Table 1 describes some simple cases and some more complex cases can be derived from the simple cases. The more complex cases, like (1, 0, 1, 0, 1) are controlled by combining the control for (1, 0, 1, 0, 0) and (1, 0, 0, 0, 1) from the Table 1. So, in this example, the controller can cause all groups of LEDs to power ON CYAN LEDs and power OFF NON-NON-CYAN LEDs, but for a group of rear and front LEDs (1) powers OFF CYAN LEDs and periodically powers ON NON-CYAN LEDs or (2) periodically mix CYAN LEDs and NON-CYAN LEDs to generate flashing mixed color and for another group of rear and front LEDs (1) powers OFF CYAN LEDs and powers ON NON-CYAN LEDs or (2) mix CYAN LEDs and NON-CYAN LEDs to generate mixed color.

Note that, while Table 1 indicates that all groups 918 of LEDs 912, 914 are powered on in some circumstances, in some embodiments only a subset of the groups of LEDs 912, 914 can be powered on. In such embodiments, the subset of the groups of LEDs can be sufficient to provide the vehicle mode indicator and the overriding indicator.

In some embodiments, intensity can be separately controlled and adjusted by setting appropriate pulse widths for each LED using a suitable lighting logic and control module and/or pulse width modulation module. This is illustrated with respect to FIG. 10, which illustrates a pixel matrix lighting control system 1000 suitable for controlling a pixel matrix micro-LED array that can contain thousands to millions of microscopic LED pixels that actively emit light and are individually controlled. To emit light in a pattern or sequence that results in display of an image, the current levels of the micro-LED pixels at different locations on an array are adjusted individually according to a specific image.

Figure 10:
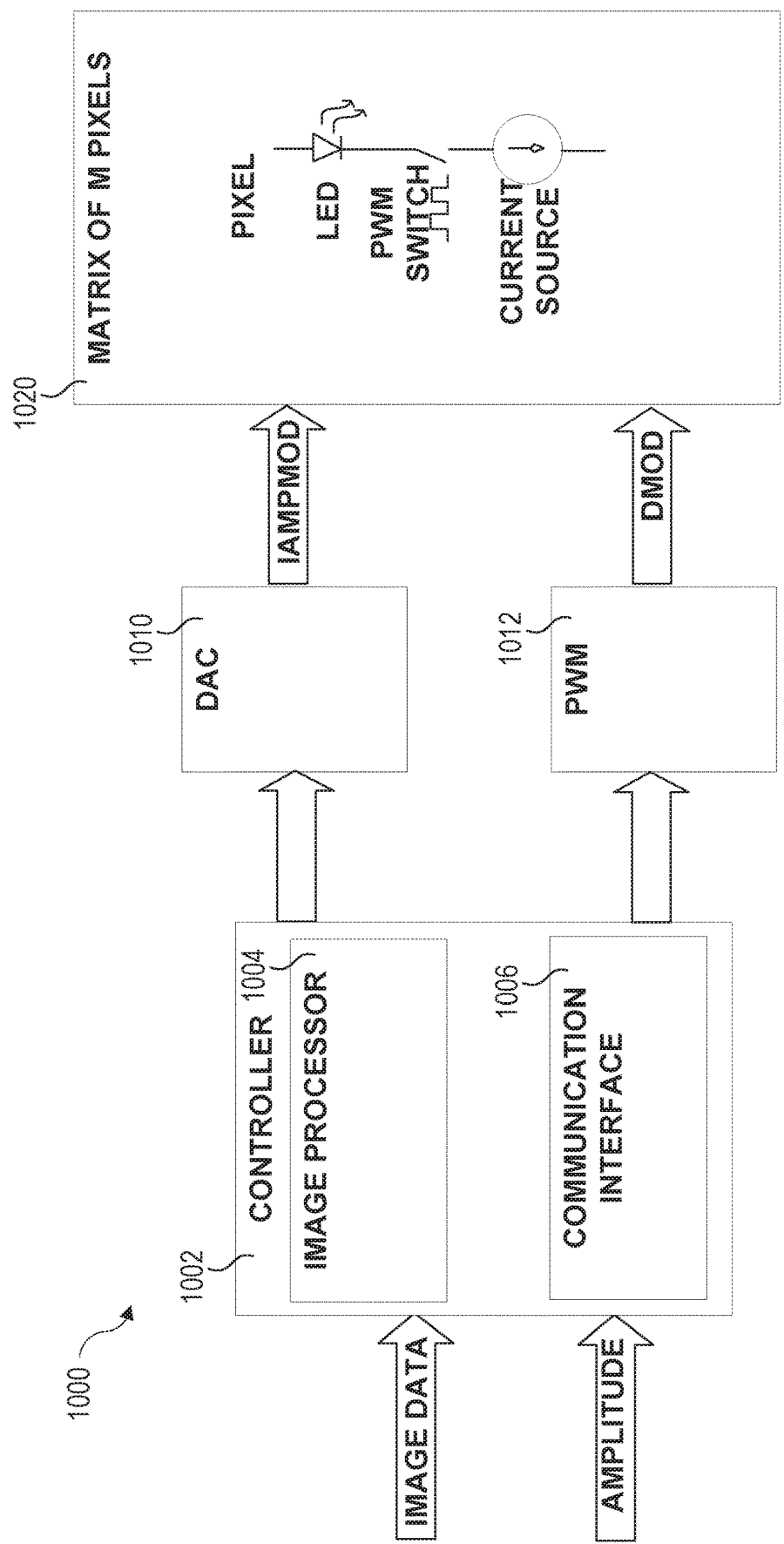
FIG. 10 illustrates a pixel matrix lighting control system suitable for controlling a pixel matrix micro-LED array.

Processing modules that facilitate efficient power usage in the system 1000 are illustrated in FIG. 10. The system 1000 includes a control module 1002 able to implement pixel or group pixel level control of amplitude and duty cycle such as discussed using procedures described with respect to FIGS. 1a-1d, 2, 3, 4, 5, 6, 7, 8, and 9. In some embodiments, the system 1000 further includes an image processing module 1004 to generate, process, or transmit an image, and digital control interfaces 1006, such as inter-integrated circuit (I2C), control area network (CAN) bus, local interconnect network (LIN), or the like that are configured to transmit control data or instructions. The digital control interfaces 1006 and control module 1002 may include the system microcontroller and any type of wired or wireless module configured to receive a control input from an external device. By way of example, a wireless module may include Bluetooth, Zigbee, Z-wave, mesh, WiFi, near field communication (NFC) and/or peer to peer modules may be used. The microcontroller may be any type of special purpose computer or processor that may be embedded in an LED lighting system and configured or configurable to receive inputs from the wired or wireless module or other modules in the LED system and provide control signals to other modules based thereon. In some embodiments, the lighting controller 910 can provide feedback to the vehicle controller 802, such as to indicate whether the LEDs 912, 914 are operating properly. Algorithms implemented by the microcontroller or other suitable control module 1002 may be implemented in a computer program, software, or firmware incorporated in a non-transitory computer-readable storage medium for execution by the special purpose processor. Examples of non-transitory computer-readable storage mediums include a read only memory (ROM), a random access memory (RAM), a register, cache memory, and semiconductor memory devices. The memory may be included as part of the microcontroller or may be implemented elsewhere, either on or off a printed circuit or electronics board The term module, as used herein, may refer to electrical and/or electronic components disposed on individual circuit boards that may be soldered to one or more electronics boards. The term module may, however, also refer to electrical and/or electronic components that provide similar functionality, but which may be individually soldered to one or more circuit boards in a same region or in different regions.

As will be appreciated, in some embodiments a modulation computation may be done by the control module 1002 through directly generating a modulated image. Alternatively, a standard image file can be processed or otherwise converted to provide modulation. Image data that mainly contains PWM duty cycle values is processed for all pixels in image processing module 1004. Since amplitude is a fixed value or rarely changed value, amplitude related commands can be given separately through a simpler digital interface (e.g. I2C). The control module 1002 interprets all the digital data, which is then used by PWM generator 1012 to generate modulated PWM signals, Dmod, for pixels, and by Digital-to-Analog Converter (DAC) module 1010 to generate the control signals for obtaining the required current source amplitude. The modulated amplitude and PWM duty cycle can be coupled to the pixel matrix 1020 that contains m pixel units. Each pixel unit is composed of the micro-LED, a PWM switch with the modulated duty cycle, and a current source with the modulated amplitude. FIG. 10 regards micro-LED array embodiments, but other LEDs can be used, such as a bare LED die, a mini-LED, a macro-LED, or other LED.

In some embodiments the DAC module 1010 may contain multiple DAC units, with the total number of n and no more than the total number of pixels, m. Modulation resolution or steps determine the number of bits needed for operation of the DAC module 1010. Finer resolution or increasing number of amplitude steps can require more bits and a larger DAC module. For instance, one amplitude partition method can only require multiple 2-bit DAC units, whereas a more complex grouped amplitude scheme may require significantly more bits and processing power.

Figure 11:
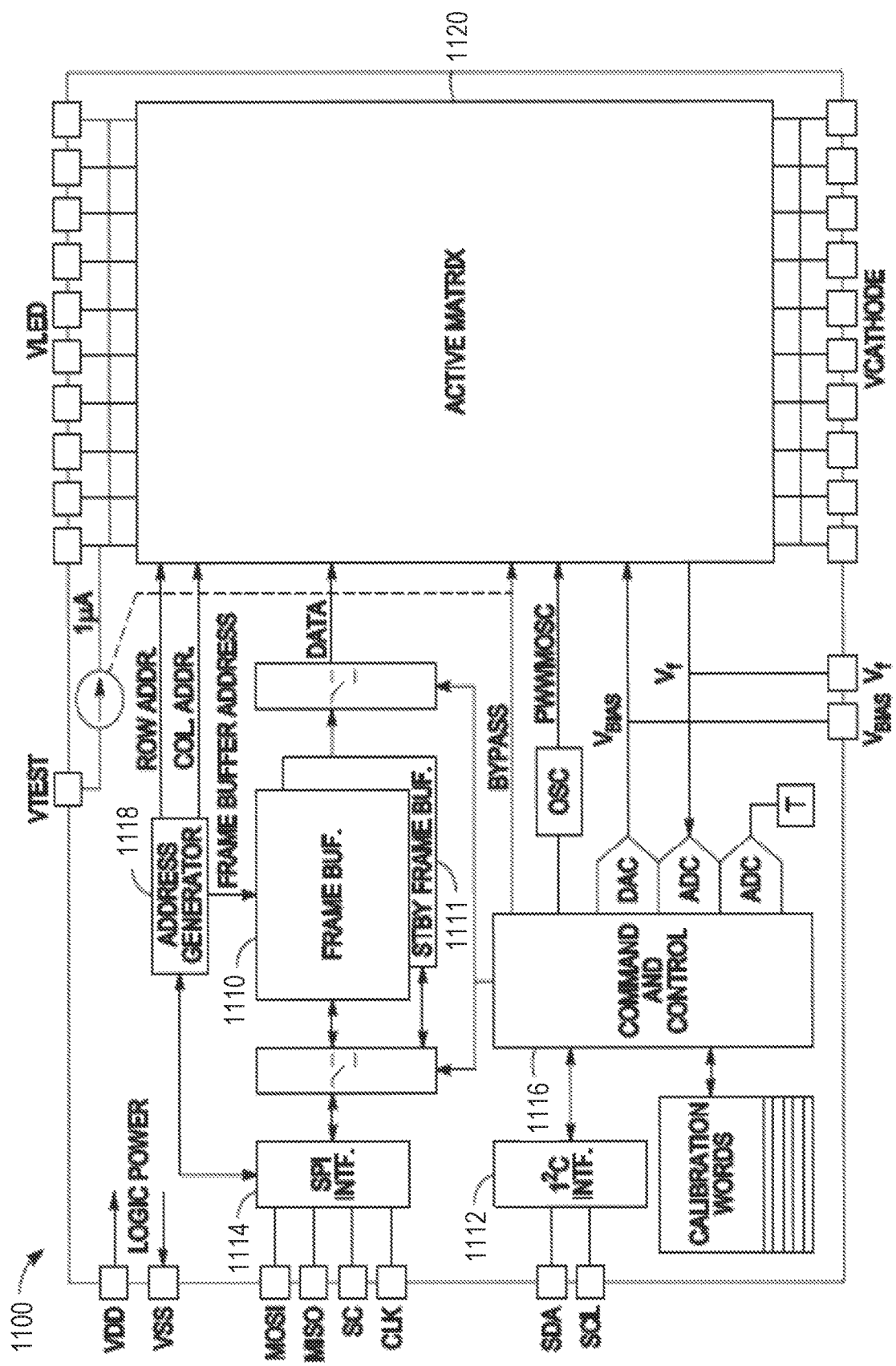
FIG. 11 illustrates in more detail one chip level implementation of a system supporting functionality such as discussed with respect to FIG. 10.

FIG. 11 illustrates in more detail one chip level implementation of a system 1100 supporting functionality such as discussed with respect to FIG. 10. The system 1100 includes a command and control module 1116 able to implement pixel or group pixel level control of amplitude and duty cycle for circuitry and procedures such as discussed with respect to 1a-1d, 2, 3, 4, 5, 6, 7, 8, 9, and 10. In some embodiments the system 1100 further includes a frame buffer 1110 for holding generated or processed images that can be supplied to an active LED matrix 1120. Other modules can include digital control interfaces such as I²C serial bus (1112), Serial Peripheral Interface (SPI) (1114), CAN, LIN, or other bus system interface that are configured to transmit needed control data or instructions.

In operation, system 1100 can accept image or other data from a vehicle or other source that arrives via the SPI interface 1114. Successive images or video data can be stored in an image frame buffer 1110. If no image data is available, one or more standby images held in a standby image buffer 1111 can be directed to the image frame buffer 1110. Such standby images can include, for example, an intensity and spatial pattern consistent with legally allowed low beam headlamp radiation patterns of a vehicle, or default light radiation patterns for architectural lighting or displays.

In operation, pixels in the images are used to define response of corresponding LED pixels in the active, with intensity and spatial modulation of LED pixels being based on the image(s). To reduce data rate issues, groups of pixels (e.g. 5×5 blocks) can be controlled as single blocks in some embodiments. In some embodiments, high speed and high data rate operation is supported, with pixel values from successive images able to be loaded as successive frames in an image sequence at a rate between 30 Hz and 100 Hz, with 60 Hz being typical. Pulse width modulation can be used to control each pixel to emit light in a pattern and with an intensity at least partially dependent on the image held in the image frame buffer 1110.

In some embodiments, the system 1100 can receive logic power via Vdd and Vss pins. An active matrix receives power for LED array control by multiple VLED and VCathode pins. The SPI 1114 can provide full duplex mode communication using a master-slave architecture with a single master. The master device originates the frame for reading and writing. Multiple slave devices are supported through selection with individual slave select (SS) lines. Input pins can include a Master Output Slave Input (MOSI), a Master Input Slave Output (MISO), a chip select (SC), and clock (CLK), all connected to the SPI interface 1114. The SPI interface connects to an address generator, frame buffer, and a standby frame buffer. Pixels can have parameters set and signals or power modified (e.g. by power gating before input to the frame buffer, or after output from the frame buffer via pulse width modulation or power gating) by a command and control module. The SPI interface 1114 can be connected to an address generation module 1118 that in turn provides row and address information to the active matrix 1120. The address generator module 1118 in turn can provide the frame buffer address to the frame buffer 1110.

In some embodiments, the command and control module 1116 can be externally controlled via an I²C serial bus 1112, CAN, LIN, or other bus control system. A clock (SCL) pin and data (SDA) pin with 7-bit addressing can be supported. The command and control module 1116 can include a digital to analog converter (DAC) and two analog to digital converters (ADC). These are respectively used to set Vbias for a connected active matrix, help determine maximum Vf, and determine system temperature. Also connected are an oscillator (OSC) to set the pulse width modulation oscillation (PWMOSC) frequency for the active matrix 1120. In one embodiment, a bypass line is also present to allow address of individual pixels or pixel blocks in the active matrix for diagnostic, calibration, or testing purposes. The active matrix 1120 can be further supported by row and column select that is used to address individual pixels, which are supplied with a data line, a bypass line, a PWMOSC line, a Vbias line, and a Vf line.

As will be understood, in some embodiments the described circuitry and active matrix LEDs 1120 can be packaged and optionally include a submount or printed circuit board connected for powering and controlling light production by the semiconductor LED. In certain embodiments, the printed circuit board can also include electrical vias, heat sinks, ground planes, electrical traces, and flip chip or other mounting systems. The submount or printed circuit board may be formed of any suitable material, such as ceramic, silicon, aluminum, etc. If the submount material is conductive, an insulating layer is formed over the substrate material, and the metal electrode pattern is formed over the insulating layer. The submount can act as a mechanical support, providing an electrical interface between electrodes on the LED and a power supply, and also provide heat sinking.

In some embodiments, the active matrix 1120 can be formed from light emitting elements of various types, sizes, and layouts. In one embodiment, one or two dimensional matrix arrays of individually addressable light emitting diodes (LEDs) can be used. Commonly N×M arrays where N and M are respectively greater than thousands and often greater than one million can be used. Individual LED structures can have a square, rectangular, hexagonal, polygonal, circular, arcuate or other surface shape. Arrays of the LED assemblies or structures can be arranged in geometrically straight rows and columns, staggered rows or columns, curving lines, or semi-random or random layouts. LED assemblies can include multiple LEDs formed as individually addressable pixel arrays are also supported. In some embodiments, radial or other non-rectangular grid arrangements of conductive lines to the LED can be used. In other embodiments, curving, winding, serpentine, and/or other suitable non-linear arrangements of electrically conductive lines to the LEDs can be used.

In some embodiments, arrays of microLEDs (µLEDs or uLEDs) can be used. MicroLEDs can support high density pixels having a lateral dimension less than 100 µm by 100 µm. In some embodiments, microLEDs with dimensions of about 50 µm in diameter or width and smaller can be used. Such microLEDS can be used for the manufacture of color displays by aligning in close proximity microLEDs comprising red, blue and green wavelengths. In other embodiments, microLEDS can be defined on a monolithic gallium nitride (GaN) or other semiconductor substrate, formed on segmented, partially, or fully divided semiconductor substrate, or individually formed or panel assembled as groupings of microLEDs. In some embodiments, the active matrix 1120 can include small numbers of microLEDs positioned on substrates that are centimeter scale area or greater. In some embodiments, the active matrix 1120 can support microLED pixel arrays with hundreds, thousands, or millions of light emitting LEDs positioned together on centimeter scale area substrates or smaller. In some embodiments, microLEDS can include light emitting diodes sized between 30 microns and 500 microns. In some embodiments each of the light emitting pixels in the light emitting pixel array can be positioned at least 1 millimeter apart to form a sparse LED array. In other embodiments sparse LED arrays of light emitting pixels can be positioned less than 1 millimeter apart and can be spaced apart by distances ranging from 30 microns to 500 microns. They can be embedded in a solid or a flexible substrate, which can be at least in part transparent. For example, the light emitting pixel arrays can be at least partially embedded in glass, ceramic, or polymeric materials.

Light emitting matrix pixel arrays such as discussed herein may support applications that benefit from fine-grained intensity, spatial, and temporal control of light distribution. This may include, but is not limited to, precise spatial patterning of emitted light from pixel blocks or individual pixels. Depending on the application, emitted light may be spectrally distinct, adaptive over time, and/or environmentally responsive. The light emitting pixel arrays may provide pre-programmed light distribution in various intensity, spatial, or temporal patterns. The emitted light may be based at least in part on received sensor data and may be used for optical wireless communications. Associated optics may be distinct at a pixel, pixel block, or device level. An example light emitting pixel array may include a device having a commonly controlled central block of high intensity pixels with an associated common optic, whereas edge pixels may have individual optics. Common applications supported by light emitting pixel arrays include video lighting, automotive headlights, architectural and area illumination, street lighting, and informational displays.

Vehicle headlamps are a light emitting array application that can benefit from large pixel numbers and a high data refresh rate. Automotive headlights that actively illuminate only selected sections of a roadway can used to reduce problems associated with glare or dazzling of oncoming drivers. Using infrared cameras as sensors, light emitting pixel arrays activate only those pixels needed to illuminate the roadway, while deactivating pixels that may dazzle pedestrians or drivers of oncoming vehicles. In addition, off-road pedestrians, animals, or signs may be selectively illuminated to improve driver environmental awareness. If pixels of the light emitting pixel array are spectrally distinct, the color temperature of the light may be adjusted according to respective daylight, twilight, or night conditions. Some pixels may be used for optical wireless vehicle to vehicle communication.

An LED light module can include matrix LEDs, alone or in conjunction with primary or secondary optics, including lenses or reflectors. To reduce overall data management requirements, the light module can be limited to on/off functionality or switching between relatively few light intensity levels. Full pixel level control of light intensity is not necessarily supported.

In operation, pixels in the images are used to define response of corresponding LED pixels in the pixel module, with intensity and spatial modulation of LED pixels being based on the image(s). To reduce data rate issues, groups of pixels (e.g., 5×5 blocks) can be controlled as single blocks in some embodiments. High speed and high data rate operation is supported, with pixel values from successive images able to be loaded as successive frames in an image sequence at a rate between 30 Hz and 100 Hz, with 60 Hz being typical. In conjunction with a pulse width modulation module, each pixel in the pixel module can be operated to emit light in a pattern and with intensity at least partially dependent on the image held in the image frame buffer.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments may be practiced in the absence of an element/step not specifically disclosed herein. In those embodiments supporting software controlled hardware, the methods, procedures, and implementations described herein may be realized in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Figure 12:
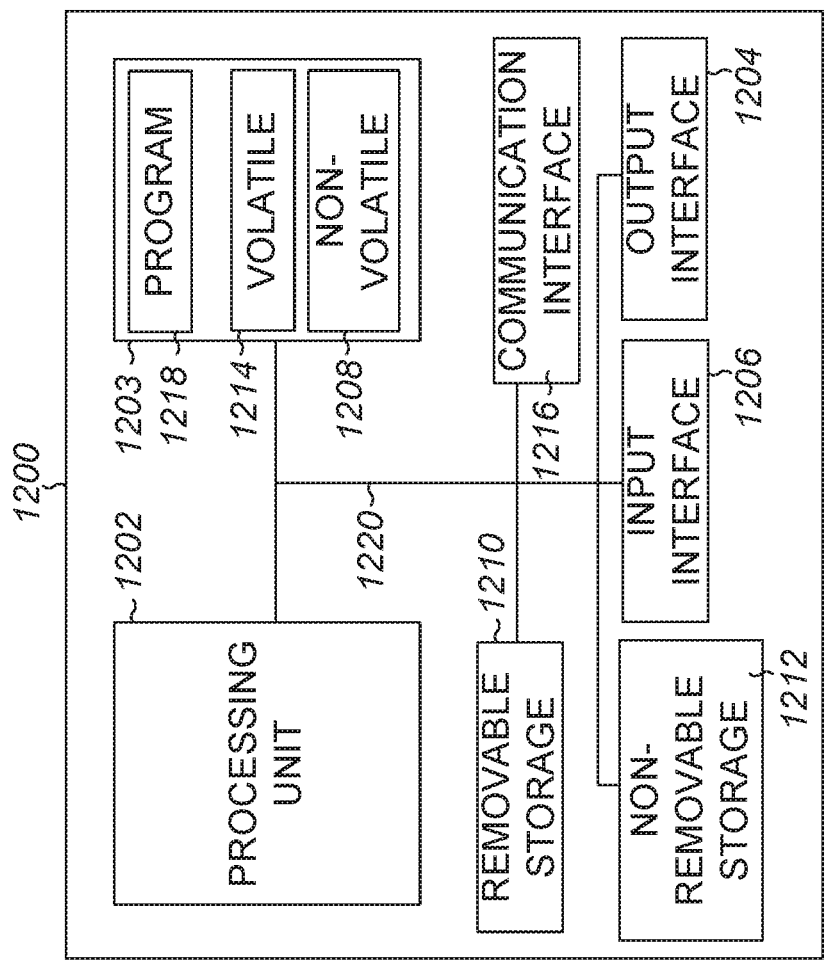
FIG. 12 illustrates, by way of example, a block diagram of an embodiment of a machine (e.g., a computer system) to at least partially implement one or more embodiments.

FIG. 12 illustrates, by way of example, a block diagram of an embodiment of a machine 1200 (e.g., a computer system) to at least partially implement one or more embodiments. One example machine 1200 (in the form of a computer), may include a processing unit 1202, memory 1203, removable storage 1210, and non-removable storage 1212. Although the example computing device is illustrated and described as machine 1200, the computing device may be in different forms in different embodiments. Further, although the various data storage elements are illustrated as part of the machine 1200, the storage may also or alternatively include cloud-based storage accessible via a network, such as the Internet. In some embodiments, one of the vehicle controller 802, LED controller 910, LED driver 916, controller 1002 (which can be the same or similar to the controller 802 or 910, image processor 1004, communication interface 1006, or other component can include one or more of the components of the machine 1200 of FIG. 12.

Memory 1203 may include volatile memory 1214 and non-volatile memory 1208. The machine 1200 may include—or have access to a computing environment that includes—a variety of computer-readable media, such as volatile memory 1214 and non-volatile memory 1208, removable storage 1210 and non-removable storage 1212. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 1200 may include or have access to a computing environment that includes input 1206, output 1204, and a communication connection 1216. Output 1204 may include a display device, such as a touchscreen, that also may serve as an input device. The input 1206 may include one or more of a touchscreen, touchpad, mouse, keyboard, camera, microphone, an infrared (IR) sensor, one or more device-specific buttons, one or more sensors integrated within or coupled via wired or wireless data connections to the machine 1200, and other input devices. The computer may operate in a networked environment using a communication connection to connect to one or more remote computers, such as database servers, including cloud based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, a mobile communication network, such as global system for mobile communication (GSM), enhanced data rates for GSM evolution (EDGE), long-term evolution (LTE), fifth generation (5G), or other networks.

Computer-readable instructions stored on a computer-readable storage device are executable by the processing unit 1202 of the machine 1200. A hard drive, CD-ROM, and RAM are some examples of articles including a non-transitory computer-readable medium such as a storage device. For example, a computer program 1218 may be used to cause processing unit 1202 to perform one or more methods or algorithms described herein.

Additional Notes and Examples

Example 1 can include a light-emitting diode (LED) system of an at least partially autonomous vehicle, the system comprising a first group of LEDs including cyan and amber LEDs, a second group of LEDs including cyan and at least one of red or amber LEDs, a third group of LEDs including cyan LEDs, and a controller configured to receive a first control signal indicating whether the at least partially autonomous vehicle is in autonomous drive mode or manual drive mode and cause the cyan LEDs of the first, second, and third groups LEDs to provide perceived cyan light when and only when the autonomous vehicle is in the autonomous drive mode.

In Example 2, Example 1 can further include, wherein the first, second, and third groups of LEDs include micro-LED arrays.

In Example 3, at least one of Examples 1-2 can further include, wherein the first, second, and third groups of LEDs are situated such that they produce cyan color visible from all sides of the autonomous vehicle.

In Example 4, Example 3 can further include, wherein the first, second, and third groups of LEDs are arranged such that they produce cyan color in a continuous, uninterrupted line around the vehicle while the vehicle is in the autonomous drive mode.

In Example 5, Example 4 can further include, wherein first, second, and third groups of LEDs are arranged such that they produce cyan color in a continuous, uninterrupted line around the vehicle unless there is an overriding indicator and while the vehicle is in the autonomous drive mode.

In Example 6, at least one of Examples 1-5, can further include wherein the controller is configured to receive a second control signal indicating whether a turn signal of the autonomous vehicle is activated and cause the first and second group of LEDs to generate a perceived, non-cyan flashing light while the third LED group emits cyan when the vehicle is in an autonomous drive mode and does not emit when the vehicle is in manual drive mode.

In Example 7, at least one of Examples 1-6 can further include, wherein the controller is configured to receive a third control signal indicating whether headlights of the autonomous vehicle are to be powered on and cause the first group of LEDs to generate a perceived continuous white light while the second and third LED groups emit cyan when the vehicle is in an autonomous drive mode and do not emit when the vehicle is in manual drive mode.

In Example 8, at least one of Examples 1-7 can further include, wherein the controller is configured to receive a fourth control signal indicating whether brakes of the autonomous vehicle are engaged and cause the second group of LEDs to generate a perceived continuous red or amber light while the first and third LED groups emit cyan when the vehicle is in an autonomous drive mode and do not emit when the vehicle is in manual drive mode.

In Example 9, at least one of Examples 1-8 can further include, wherein the controller is configured to receive a fifth control signal indicating whether an engine of the autonomous vehicle is in park and cause the first group of LEDs to generate a perceived continuous white light and the second group of LEDs to generate a perceived continuous red light while the second LED group emits cyan when the vehicle is in an autonomous drive mode and do not emit when the vehicle is in manual drive mode.

Example 10 includes an at least partially autonomous vehicle comprising sensors, a first group of LEDs including cyan and amber LEDs, a second group of LEDs including cyan and at least one of red or amber LEDs, a third group of LEDs including cyan LEDs, a vehicle controller to receive data from the sensors and provide corresponding command signals including an indication of whether the at least partially autonomous vehicle is in autonomous drive mode, a light emitting diode (LED) controller to receive the command signals and issue command signals to cause the first, second, and third groups of LEDs indicating to provide perceived cyan light when and only when the autonomous vehicle is in the autonomous drive mode.

In Example 11, Example 10 can further include, wherein the second, and third groups of LEDs include micro-LED arrays.

In Example 12, at least one of Examples 10-11 can further include, wherein the first, second, and third groups of LEDs are situated such that they produce cyan color visible from all sides of the autonomous vehicle.

In Example 13, Example 12 can further include, wherein the first, second, and third groups of LEDs are arranged such that they produce cyan color in a continuous, uninterrupted line around the vehicle while the vehicle is in the autonomous drive mode.

In Example 14, Example 13 can further include, wherein the first, second, and third groups of LEDs are arranged such that they produce cyan color in a continuous, uninterrupted line around the vehicle unless there is an overriding indicator and while the vehicle is in the autonomous drive mode.

In Example 15, at least one of Examples 10-14 can further include, wherein the controller is configured to receive a second control signal indicating whether a turn signal of the autonomous vehicle is activated and cause the first and second group of LEDs to generate a perceived, non-cyan flashing light while the third LED group emits cyan when the vehicle is in an autonomous drive mode and does not emit when the vehicle is in manual drive mode.

In Example 16, at least one of Examples 10-15 can further include, wherein the controller is configured to receive a third control signal indicating whether headlights of the autonomous vehicle are to be powered on and cause the first group of LEDs to generate a perceived continuous white light while the second and third LED groups emit cyan when the vehicle is in an autonomous drive mode and do not emit when the vehicle is in manual drive mode.

In Example 17, at least one of Examples 10-16 can further include, wherein the controller is configured to receive a fourth control signal indicating whether brakes of the autonomous vehicle are engaged and cause the second group of LEDs to generate a perceived continuous red or amber light while the first and third LED groups emit cyan when the vehicle is in an autonomous drive mode and do not emit when the vehicle is in manual drive mode.

In Example 18, at least one of Examples 10-17 can further include, wherein the controller is configured to receive a fifth control signal indicating whether an engine of the autonomous vehicle is in park and cause the first group of LEDs to generate a perceived continuous white light and the second group of LEDs to generate a perceived continuous red light while the second LED group emits cyan when the vehicle is in an autonomous drive mode and do not emit when the vehicle is in manual drive mode.

Example 19 can include a method for at least partially autonomous vehicle light-emitting diode (LED) control, the method comprising receiving, at an LED controller, a first control signal indicating whether the at least partially autonomous vehicle is in autonomous drive mode or manual drive mode, and providing one or more signals to cause a first group of LEDs including cyan and amber LEDs, a second group of LEDs including cyan and at least one of red or amber LEDs, and a third group of LEDs including cyan LEDs to provide perceived cyan light when and only when the autonomous vehicle is in the autonomous drive mode.

In Example 20, Example 19 can further include, wherein the first, second, and third groups of LEDs are situated such that they produce cyan color visible from all sides in a continuous, uninterrupted line around the vehicle while the vehicle is in the autonomous drive unless there is an overriding indicator and while the vehicle is in the autonomous drive mode.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A light-emitting diode (LED) system of an at least partially autonomous vehicle, the system comprising:
    a first group of LEDs including cyan and amber LEDs;
    a second group of LEDs including cyan and at least one of red or amber LEDs;
    a third group of LEDs including cyan LEDs; and
    a controller configured to:
        receive a first control signal indicating whether the at least partially autonomous vehicle is in autonomous drive mode or manual drive mode and cause the cyan LEDs of the first, second, and third groups LEDs to provide perceived cyan light when and only when the autonomous vehicle is in the autonomous drive mode, and
        receive a second control signal indicating whether a turn signal of the autonomous vehicle is activated and cause the first and second group of LEDs to generate a perceived, non-cyan flashing light when the turn signal is activated while the third group of LEDs emits cyan when the vehicle is in an autonomous drive mode and the third group of LEDs does not emit when the vehicle is in manual drive mode.

2. The LED system of claim 1, wherein the first, second, and third groups of LEDs include micro-LED arrays.

3. The LED system of claim 1, wherein the first, second, and third groups of LEDs are situated such that they produce cyan color visible from all sides of the autonomous vehicle.

4. The LED system of claim 3, wherein the first, second, and third groups of LEDs are arranged such that they produce cyan color in a continuous, uninterrupted line around the vehicle while the vehicle is in the autonomous drive mode.

5. The LED system of claim 4, wherein first, second, and third groups of LEDs are arranged such that they produce cyan color in a continuous, uninterrupted line around the vehicle unless there is an overriding indicator and while the vehicle is in the autonomous drive mode.

6. The LED system of claim 1, wherein the controller is configured to receive a third control signal indicating whether headlights of the autonomous vehicle are to be powered on and cause the first group of LEDs to generate a perceived continuous white light when the headlights are to be powered on while the second and third group of LEDs emit cyan when the vehicle is in an autonomous drive mode and do not emit when the vehicle is in manual drive mode.

7. The LED system of claim 1, wherein the controller is configured to receive a fourth control signal indicating whether brakes of the autonomous vehicle are engaged and cause the second group of LEDs to generate a perceived continuous red or amber light when the brakes of the autonomous vehicle are engaged while the first and third LED groups emit cyan when the vehicle is in an autonomous drive mode and do not emit when the vehicle is in manual drive mode.

8. The LED system of claim 1, wherein the controller is configured to receive a fifth control signal indicating whether an engine of the autonomous vehicle is in park and cause the first group of LEDs to generate a perceived continuous white light and the second group of LEDs to generate a perceived continuous red light when the engine is in park while the second LED group emits cyan when the vehicle is in an autonomous drive mode and do not emit when the vehicle is in manual drive mode.

9. An at least partially autonomous vehicle comprising:
sensors;
a first group of LEDs including cyan and amber LEDs;
a second group of LEDs including cyan and at least one of red or amber LEDs;
a third group of LEDs including cyan LEDs;
a vehicle controller to receive data from the sensors and provide corresponding command signals including a first control signal that provides an indication of whether the at least partially autonomous vehicle is in autonomous drive mode; and
a light emitting diode (LED) controller to receive the command signals and issue command signals to cause the first, second, and third groups of LEDs indicating to provide perceived cyan light when and only when the autonomous vehicle is in the autonomous drive mode and to receive a second control signal of the command signals indicating whether headlights of the autonomous vehicle are to be powered on and cause the first group of LEDs to generate a perceived continuous white light when the headlights are to be powered on while the second and third LED groups emit cyan when the vehicle is in an autonomous drive mode and do not emit when the vehicle is in manual drive mode.

10. The vehicle of claim 9, wherein the first, second, and third groups of LEDs include micro-LED arrays.

11. The vehicle of claim 9, wherein the first, second, and third groups of LEDs are situated such that they produce cyan color visible from all sides of the autonomous vehicle.

12. The vehicle of claim 11, wherein the first, second, and third groups of LEDs are arranged such that they produce cyan color in a continuous, uninterrupted line around the vehicle while the vehicle is in the autonomous drive mode.

13. The vehicle of claim 12, wherein first, second, and third groups of LEDs are arranged such that they produce cyan color in a continuous, uninterrupted line around the vehicle unless there is an overriding indicator and while the vehicle is in the autonomous drive mode.

14. The vehicle of claim 9, wherein the controller is configured to receive a third control signal indicating whether a turn signal of the autonomous vehicle is activated and cause the first and second group of LEDs to generate a perceived, non-cyan flashing light when the turn signal is activated while the third LED group emits cyan when the vehicle is in an autonomous drive mode and does not emit when the vehicle is in manual drive mode.

15. The vehicle of claim 9, wherein the controller is configured to receive a fourth control signal indicating whether brakes of the autonomous vehicle are engaged and cause the second group of LEDs to generate a perceived continuous red or amber light when the brakes are engaged while the first and third LED groups emit cyan when the vehicle is in an autonomous drive mode and do not emit when the vehicle is in manual drive mode.

16. The vehicle of claim 9, wherein the controller is configured to receive a fifth control signal indicating whether an engine of the autonomous vehicle is in park and cause the first group of LEDs to generate a perceived continuous white light and the second group of LEDs to generate a perceived continuous red light when the engine is in park while the second LED group emits cyan when the vehicle is in an autonomous drive mode and do not emit when the vehicle is in manual drive mode.

17. A method for at least partially autonomous vehicle light-emitting diode (LED) control, the method comprising:
receiving, at an LED controller, a first control signal indicating whether the at least partially autonomous vehicle is in autonomous drive mode or manual drive mode;
providing one or more signals to cause a first group of LEDs including cyan and amber LEDs, a second group of LEDs including cyan and at least one of red or amber LEDs, and a third group of LEDs including cyan LEDs to provide perceived cyan light when and only when the autonomous vehicle is in the autonomous drive mode; and
receiving a second control signal indicating whether brakes of the autonomous vehicle are engaged and cause the second group of LEDs to generate a perceived continuous red or amber light when the brakes are engaged while the first and third LED groups emit cyan when the vehicle is in an autonomous drive mode and do not emit when the vehicle is in manual drive mode.

18. The method of claim 17, wherein the first, second, and third groups of LEDs are situated such that they produce cyan color visible from all sides in a continuous, uninterrupted line around the vehicle while the vehicle is in the autonomous drive unless there is an overriding indicator and while the vehicle is in the autonomous drive mode.

* * * * *